United States Patent [19]

Boerekamp

[11] Patent Number: 5,057,738

[45] Date of Patent: Oct. 15, 1991

[54] SOFT MAGNETIC MGMNZN-FERRITE MATERIAL, DEFLECTION RING MANUFACTURED FROM SAID MATERIAL, AND AS A CATHODE-RAY TUBE COMPRISING A DEFLECTION COIL HAVING SUCH A DEFLECTION RING

[75] Inventor: Jacobus G. Boerekamp, Eindhoven, Netherlands

[73] Assignee: U.S. Philips Corporation, New York, N.Y.

[21] Appl. No.: 529,003

[22] Filed: May 24, 1990

[30] Foreign Application Priority Data

May 26, 1989 [NL] Netherlands ......................... 8901320

[51] Int. Cl.$^5$ ............................................. C04B 35/26
[52] U.S. Cl. .................................. 313/440; 252/62.61; 252/62.62; 252/62.64; 335/296
[58] Field of Search ............... 252/62.61, 62.62, 62.64; 335/297, 296; 313/440

[56] References Cited

U.S. PATENT DOCUMENTS

| | | | |
|---|---|---|---|
| 3,007,875 | 11/1961 | Albers-Schoenberg | 252/62.61 |
| 3,476,688 | 11/1969 | Friess et al. | 252/62.61 |
| 3,609,084 | 9/1971 | Loye | 252/62.61 |
| 4,277,356 | 7/1981 | Simonet | 252/62.61 |
| 4,846,987 | 7/1989 | Togane | 252/62.64 |

FOREIGN PATENT DOCUMENTS

| | | | |
|---|---|---|---|
| 989389 | 4/1965 | United Kingdom | 252/62.61 |
| 1008120 | 10/1965 | United Kingdom | 252/62.61 |

*Primary Examiner*—Jack Cooper

[57] ABSTRACT

A novel MgMnZn-ferrite material is described which is particularly suitable for deflection rings which are mounted in the deflection coil of a cathode-ray tube. The material corresponds to the formula $(Li_{0.5}Fe_{0.5})_p Mg_q Zn_x Mn_y Fe_z O_{3/2(y+z)+1}$, wherein $0.03 \leq p \leq 0.25$
$0.30 \leq q \leq 0.60$
$0.35 \leq x \leq 0.50$
$0.03 \leq y \leq 0.18$
$1.70 \leq z \leq 1.90$
$y+z \leq 2.0$ and,
$p+q+x = 1.00$ The said material exhibits extremely low power losses and a relatively high initial permeability.

4 Claims, 1 Drawing Sheet

SOFT MAGNETIC MGMNZN-FERRITE MATERIAL, DEFLECTION RING MANUFACTURED FROM SAID MATERIAL, AND AS A CATHODE-RAY TUBE COMPRISING A DEFLECTION COIL HAVING SUCH A DEFLECTION RING

BACKGROUND OF THE INVENTION

1. Field of the Invention

The invention relates to soft magnetic MgMnZn-ferrite material which is particularly suitable for use in deflection rings. The invention also relates to a deflection ring which is manufactured from said material as well as to a cathode-ray tube comprising a deflection coil having a deflection ring according to the invention.

2. Description of the Related Art

A soft magnetic MgMnZn-ferrite material is known per se. This is a soft magnetic material which corresponds to the formula $Mg_{0.63}Zn_{0.37}Mn_{0.01}Fe_{1.78}O_4$ and which is marketed under the trade name 2A2. Said material has suitable soft magnetic properties such as a sufficiently high initial permeability ($\mu_i$) for the intended application in a cathode-ray tube, a high resistivity ($R_s$) and a high Curie temperature ($T_c$). However, said ferrite material has the disadvantage that the power losses (P) are rather high. These losses increase at higher frequencies. As present developments lead to TV receivers and monitors being operated at ever higher frequencies, the use of the known MgMnZn-ferrite in deflection coils is increasingly experienced as problematic owing to the relatively high power losses occurring under these conditions.

SUMMARY OF THE INVENTION

One of the objects of the invention is to provide a ferrite material of the type mentioned in the opening paragraph, which exhibits lower power losses than the known material. A further object of the invention is to provide a ferrite material having an initial permeability which is higher than the $\mu_i$ of the known material. A still further object of the invention is to provide a ferrite material having a sufficiently high resistivity and Curie temperature for the intended application in a cathode-ray tube.

These and other objects are achieved by means of a soft magnetic material which is characterized according to the invention in that the composition of said material corresponds to the formula:

$(Li_{0.5}Fe_{0.5})_p Mg_q Zn_x Mn_y Fe_z O_{3/2(y+z)+1}$, wherein
 $0.03 \leq p \leq 0.25$
 $0.30 \leq q \leq 0.60$
 $0.35 \leq x \leq 0.50$
 $0.03 \leq y \leq 0.18$
 $1.70 \leq z \leq 1.90$
 $y+z \leq 2.00$ and,
 $p+q+x=1.00$ It has been found, that the material according to the invention has considerably lower power losses than the known 2A2 material. The ferrite material according to the invention has initial permeability values of 400 and higher, which is much better than the values of the known 2A2 material. It has further been found that the material according to the invention has a resistivity higher than $10^3$ $\Omega m$ and a Curie temperature higher than 135° C., which properties are sufficient for the intended application as a deflection ring in a cathode-ray tube.

According to the invention, the Li content in the novel MgMnZn ferrites has to be minimally 0.50 at.% (1.5/3; p=0.03) and maximally 4.17 at.% (12.5/3; p=0.25). When the Li-content is smaller than 0.50 at.%, the reducing effect on the power losses in the MgMnZn ferrites is hardly appreciable. However, an Li-content which is larger than 4.17 at.% leads again to an increase of the power losses.

The Mn present in the novel ferrite material is important because it provides the ferrite with a high resistivity. If the Mn content is selected too small (i.e. smaller than 1 at.%) a MgMnZn-ferrite material is obtained having a resistivity which is lower than that of the material according to the invention. If the Mn content is too high (i.e. higher than 6 at.%) a MgMnZn-ferrite material is obtained having a mechanical strength which is insufficient.

The material according to the invention further complies with the equation $y+z<2.00$. This condition ensures that there is a small deficiency of trivalent ions in the novel MgMnZn ferrite, so that all Fe and Mn present in the material trivalent. When the quantity of Fe and Mn is larger than 2.00 (i.e. $y+z>2.00$) a part of said trivalent ions can be converted into divalent ions in a simple manner. In particular the presence of divalent Fe reduces the resistivity of the ferrite material substantially. This is experienced as a disadvantage. By virtue of the absence of divalent Fe the materials according to the invention have a relatively high resistivity. However, preferably, $y+z<1.98$. With respect to the material according to the invention, it further holds that $1.70<z<1.90$. Experiments have shown that the resistivity decreases substantially if z is selected larger than 1.90.

A preferred embodiment of the MgMnZn-ferrite materials according to the invention, is characterized in that $1.75 \leq z < 1.78$. In experiments which have led to the invention it has surprisingly been found that the novel MgMnZn-ferrite materials which comply with $1.75 \leq z \leq 1.78$ exhibit relatively high resistivities ($R_S > 10^6 \Omega m$), said materials also having a relatively high initial permeability of 500 or more.

The MgMnZn ferrites according to the invention are manufactured by means of a method which is known per se and which consists in successively mixing the starting substances in the form of, for example, oxides and/or carbonates, prefiring the mixture, wet-grinding the mixture, either drying and granulating or spray drying the mixture, and shaping and pressing the mixture, after which sintering takes place. By means of sintering, deflection rings can be manufactured from the material which is pressed into a particular annular shape. Said deflection rings are incorporated in a deflection coil which is mounted in a cathode-ray tube.

BRIEF DESCRIPTION OF THE DRAWINGS

The invention will be explained in more detail by means of the following exemplary embodiments and with reference to the accompanying drawing, in which.

DETAILED DESCRIPTION OF THE PREFERRED EMBODIMENTS

Figure 1A:
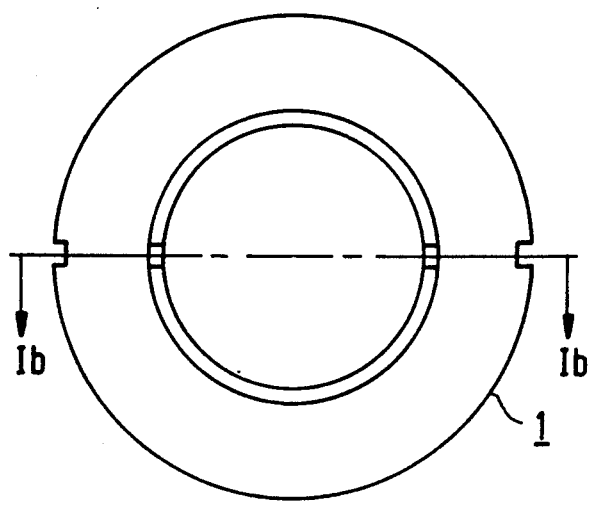
FIGS. 1a and 1b are a rear view and a longitudinal sectional view, respectively, of a deflection ring which is manufactured from the material according to the invention.

Oxides and/or carbonates of the constituent elements of the MgMnZn ferrite according to the invention were mixed in quantities corresponding to the intended composition and prefired for four hours at a temperature between 750° and 900° C. Subsequently, the prefired material was ground in water and either dried and granulated or spray-dried. After the dried material had been pressed into a shaped body, the latter was sintered in air or oxygen at a temperature of 1100°-1250° C. In a number of cases, up to 1% by weight of $H_3BO_3$ was added as a sintering agent.

Table 1 lists a number of MgMnZn-ferrite compositions which correspond to the formula $(Li_{0.5}Fe_{0.5})_p Mg_q Zn_x Mn_y Fe_z O_{3/2(y+z)+1}$. The reference numerals 1–18 denote material compositions according to the invention. The reference numerals 19–22 denote comparative material compositions which are not according to the invention. Reference numeral 19 denotes the composition of the known MgMnZn ferrite which is marketed as 2A2 material. Table 2 lists a number of properties of the compositions of Table 1. These properties are: the initial permeability ($\mu_i$), the power losses (P) in $mW/cm^3$, at 16 kHz and 64 kHz measured at 25° C. and 100° C. and a field of 100 mT, the resistivity ($R_s$) and the Curie temperature ($T_c$), respectively.

Before or after prefiring, 0.3% by weight of $H_3BO_3$ was added to the compositions having reference numerals 6 and 11–19.

Tables 1 and 2 show that the initial permeability of the compounds according to the invention is considerably higher than that of the known material (reference numeral 19). They also show that with the novel material the power losses are generally much lower than with the known material. An outstanding feature of the material according to the invention, for which it holds that $1.75 \leq z \leq 1.78$, is that it combines a high resistivity with a high initial permeability. The data of compositions 21 and 22 clearly show that the $R_s$ decreases when the Mn content is too low. The data of composition 21 show that this is also the case when the Fe content is too high.

Figure 1B:
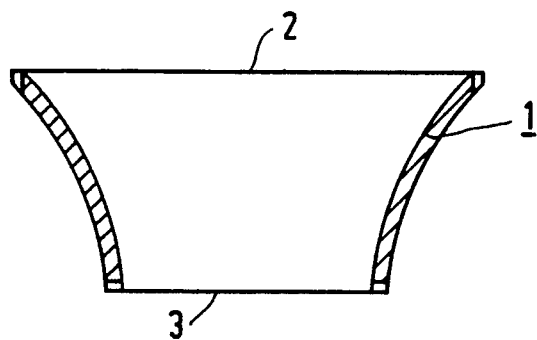

FIG. 1a is a rear view of a deflection ring which is manufactured from the material according to the invention. FIG. 1b is a cross-sectional view of said deflection ring taken on the line I—b of FIG. 1a. Said deflection ring (1) has a largest outside diameter (on the side of the flared portion (2)) of 86 mm, a smallest diameter (on the side of the neck (3)) of 54 mm, and a thickness of 6 mm. The deflection ring may be constructed in one piece or in two pieces.

Figure 2:
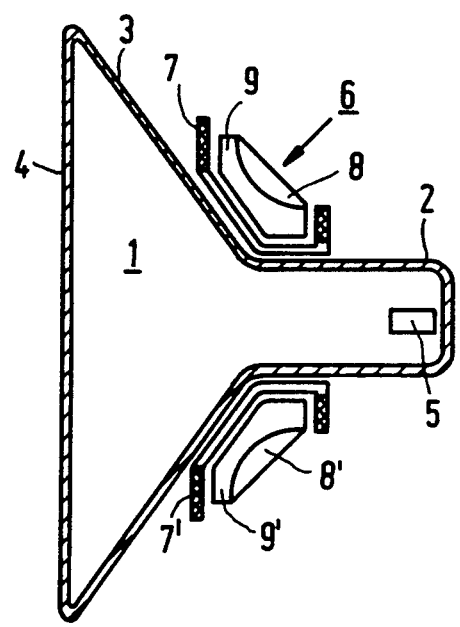
FIG. 2 diagrammatically shows a cathode-ray tube comprising a deflection coil having a deflection ring according to the invention.

FIG. 2 is a diagrammatic longitudinal sectional view of a cathode-ray tube 1 for monochrome or colour television. Said cathode-ray tube comprises a cylindrical neck portion 2 and an adjoining portion 3 which widens like a trumpet and whose front side (on the left in FIG. 1) is sealed by a display screen 4. The neck portion 2, comprises an electrode system 5 which is represented schematically and by means of which one electron beam (in the case of a monochrome display tube) or three coplanar electron beams (in the case of colour television) can be generated. A deflection coil system 6 which surrounds the tube 1 coaxially is provided on the cathode-ray tube 1 at the location where the neck portion 2 merges with the trumpet-shaped portion 3, said deflection-coil system consisting of a first layer of (saddle-shaped) deflection coils 7, 7' for deflecting the electron beams in the horizontal direction, a second pair (toroidal) deflection coils 8, 8' for deflecting the electron beams in the vertical direction and a deflection ring 9 which supports said pair of coils 8, 8'. As is shown in FIG. 1, the shape of the deflection coils 7, 7' and the deflection ring 9 is adapted to the trumpet shape of the display tube 1. The horizontal deflection coils 7, 7' are located on either side of a horizontal deflection plane which coincides with the above-mentioned plane in which the three electron beams extend. The vertical deflection coils 8, 8' are also located on either side of said horizontal deflection plane. The vertical deflection plane extends perpendicularly thereto and, hence, coincides with the plane of the drawing.

The deflection ring 9 is manufactured from sintered, soft magnetic ferrite material according to the invention. Said ring flares out to a trumpet shape towards the front, so that it fits around the pair of deflection coils 7, 7' with little clearance.

TABLE 1

| ref | p | q | x | y | z |
| --- | --- | --- | --- | --- | --- |
| 1. | 0.10 | 0.47 | 0.43 | 0.1 | 1.79 |
| 2. | 0.20 | 0.32 | 0.48 | 0.1 | 1.80 |
| 3. | 0.07 | 0.53 | 0.40 | 0.1 | 1.78 |
| 4. | 0.13 | 0.43 | 0.44 | 0.1 | 1.79 |
| 5. | 0.16 | 0.38 | 0.46 | 0.1 | 1.80 |
| 6. | 0.10 | 0.475 | 0.415 | 0.1 | 1.79 |
| 7. | 0.10 | 0.47 | 0.43 | 0.05 | 1.84 |
| 8. | 0.20 | 0.32 | 0.48 | 0.05 | 1.85 |
| 9. | 0.10 | 0.47 | 0.43 | 0.1 | 1.86 |
| 10. | 0.20 | 0.32 | 0.48 | 0.1 | 1.87 |
| 11. | 0.07 | 0.53 | 0.40 | 0.05 | 1.83 |
| 12. | 0.10 | 0.475 | 0.425 | 0.1 | 1.79 |
| 13. | 0.13 | 0.435 | 0.435 | 0.1 | 1.79 |
| 14. | 0.16 | 0.38 | 0.46 | 0.1 | 1.80 |
| 15. | 0.20 | 0.32 | 0.48 | 0.1 | 1.80 |
| 16. | 0.20 | 0.32 | 0.48 | 0.05 | 1.85 |
| 17. | 0.20 | 0.335 | 0.465 | 0.10 | 1.80 |
| 18. | 0.20 | 0.35 | 0.45 | 0.15 | 1.75 |
| 19. | 0 | 0.63 | 0.37 | 0.1 | 1.78 |
| 20. | 0.10 | 0.47 | 0.43 | 0.05 | 1.915 |
| 21. | 0.20 | 0.32 | 0.48 | 0.025 | 1.875 |
| 22. | 0.20 | 0.32 | 0.48 | 0.02 | 1.87 |

TABLE 2

| | | P (mW/cm$^3$) | | | | | |
| | $\mu m$ | 16 kHz | | 64 kHz | | $R_s$ | $T_c$ |
| ref | (i) | 25° C. | 100° C. | 25° C. | 100° C. | $\Omega m$ | °C. |
| --- | --- | --- | --- | --- | --- | --- | --- |
| 1. | 520 | 137 | 60 | 614 | 314 | $3.3 \times 10^5$ | 140 |
| 2. | 460 | 120 | 96 | 639 | 606 | $8.7 \times 10^4$ | 150 |
| 3. | 500 | 134 | 88 | 672 | 469 | $4.1 \times 10^6$ | 145 |
| 4. | 530 | 93 | 80 | 515 | 530 | $1.4 \times 10^4$ | 140 |
| 5. | 540 | 100 | 84 | 530 | 495 | $8.5 \times 10^4$ | 135 |
| 6. | 660 | 112 | 71 | 529 | 369 | $5.0 \times 10^6$ | 135 |
| 7. | 600 | 113 | 80 | 586 | 480 | $7.0 \times 10^4$ | 145 |
| 8. | 580 | 102 | 93 | 520 | 530 | — | 145 |
| 9. | 440 | 122 | 80 | 615 | 445 | $4.8 \cdot 10^4$ | 150 |
| 10. | 500 | 108 | 86 | 600 | 462 | $4.10^3$ | 155 |
| 11. | 615 | 134 | 88 | 627 | 454 | $1.0 \times 10^4$ | 150 |
| 12. | 720 | 93 | 65 | 472 | 358 | $2.0 \times 10^4$ | 135 |
| 13. | 550 | 99 | 79 | 555 | 472 | $2.0 \times 10^4$ | 135 |
| 14. | 550 | 92 | 84 | 539 | 519 | $1.5 \cdot 10^4$ | 135 |
| 15. | 670 | 90 | 86 | 535 | 538 | $1.0 \times 10^3$ | 135 |
| 16. | 450 | 146 | 132 | 700 | 655 | $5.0 \times 10^3$ | 145 |
| 17. | 710 | 112 | 76 | 532 | 395 | $3.0 \times 10^4$ | 150 |
| 18. | 660 | 112 | 63 | 537 | 319 | $2.6 \times 10^6$ | 150 |
| 19. | 370 | 169 | 127 | 749 | 653 | $\geq 1.10^6$ | $\geq 135$ |
| 20. | 460 | 127 | 91 | 647 | 520 | $1.8 \cdot 10^2$ | 155 |
| 21. | 510 | 108 | 86 | 586 | 510 | $1.0 \times 10^1$ | 165 |

TABLE 2-continued

| | | P (mW/cm$^3$) | | | | | |
| | μm | 16 kHz | | 64 kHz | | $R_s$ | $T_c$ |
| ref | (i) | 25° C. | 100° C. | 25° C. | 100° C. | Ωm | °C. |
| 22. | 520 | 108 | 86 | 586 | 510 | 2.0 × 10$^2$ | 155 |

I claim:

1. A soft magnetic MgMnZn-ferrite material which is suitable for use in deflection rings, characterized in that the material corresponds to the formula:

$$(Li_{0.5}Fe_{0.5})_p Mg_q Zn_x Mn_y Fe_z O_{3/2(y+z)+1}$$

wherein $0.03 \leq p \leq 0.25$
$0.30 \leq q \leq 0.60$
$0.35 \leq x \leq 0.50$
$0.03 \leq y \leq 0.18$
$1.70 \leq z \leq 1.90$
$y + z \leq 2.00$ and,
$p + q + x = 1.00$.

2. A soft magnetic MgMnZn-ferrite material as claimed in claim 1, characterized in that $1.75 \leq z \leq 1.78$.

3. A deflection ring comprising the soft magnetic MgMnZn-ferrite material as claimed in claim 1 or 2.

4. A cathode-ray tube comprising a deflection coil having a deflection ring comprising the soft magnetic MgMnZn-ferrite material as claimed in claim 1 or 2.

* * * * *